H. S. PIERCE.
MEANS FOR LUBRICATING CHAIN DRIVES.
APPLICATION FILED SEPT. 5, 1914.
1,161,724.
Patented Nov. 23, 1915.
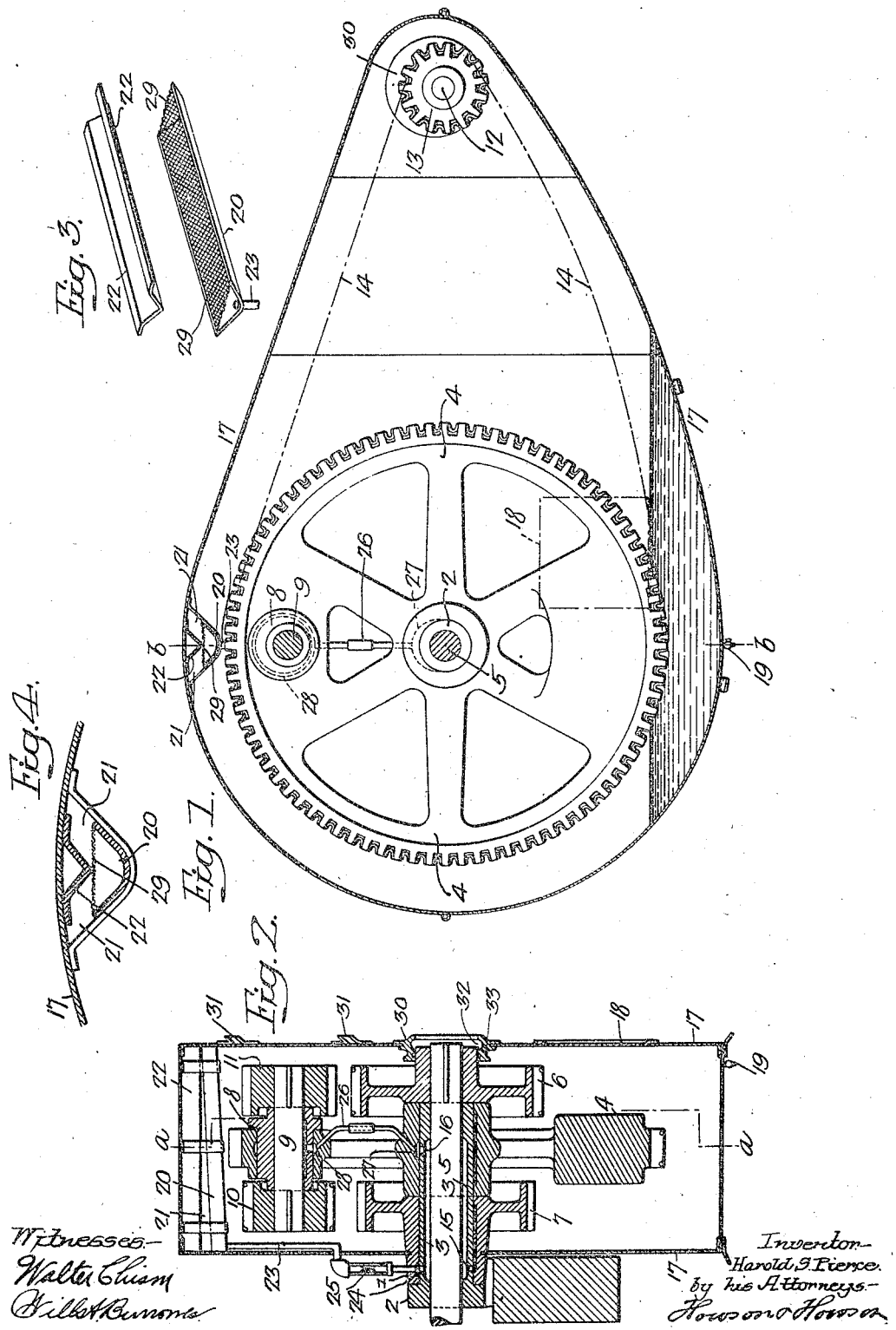

UNITED STATES PATENT OFFICE.

HAROLD S. PIERCE, OF PHILADELPHIA, PENNSYLVANIA, ASSIGNOR TO LINK-BELT COMPANY, OF CHICAGO, ILLINOIS, A CORPORATION OF ILLINOIS.

MEANS FOR LUBRICATING CHAIN DRIVES.

1,161,724.

Specification of Letters Patent. Patented Nov. 23, 1915.

Application filed September 5, 1914. Serial No. 860,415.

*To all whom it may concern:*

Be it known that I, HAROLD S. PIERCE, a citizen of the United States, residing in Philadelphia, Pennsylvania, have invented certain Improvements in Means for Lubricating Chain Drives, of which the following is a specification.

The object of my invention is to provide means for continuously lubricating chain and sprocket wheels of a chain driving mechanism.

The invention is particularly adapted for lubricating chain reducing gearing which is difficult, under certain conditions, to lubricate.

In the accompanying drawing:—Figure 1, is a longitudinal sectional view on the line *a—a*, Fig. 2; Fig. 2, is a transverse sectional view on the line *b—b*, Fig. 1, showing the deflector in full lines; Fig. 3, is a detached perspective view of the trough and deflector; and Fig. 4, is an enlarged view of a detail of Fig. 1.

Referring to the drawing, 1 is a fixed bearing through which projects a sleeve 2 having grooves 3 for a lubricant. The sleeve projects beyond the bearing and carries the main sprocket wheel 4, and extending through the sleeve is a shaft 5 carrying, at its outer end, a sprocket wheel 6 to which it is secured, in the present instance. On the bearing 1 is a sprocket wheel 7, and eccentrically mounted in an adjustable bearing 8 on the main sprocket wheel 4 is a shaft 9 to which are secured the sprocket wheels 10 and 11. On a shaft 12 is a sprocket wheel 13 in line with the main sprocket wheel. A chain 14, illustrated by dotted lines, Fig. 1, passes around the main sprocket wheel 4 and the central sprocket wheel 13, while other chains pass around the sprocket wheels 7 and 10 and 6 and 11, respectively. In the sleeve 2 are passages 15 and 16 for lubricant.

17 is a casing inclosing the sprocket wheels carried by the bearing 1, and the sprocket wheel 13. This casing is shaped so as to receive oil, or other lubricant, as indicated, and in one side of the casing is a door 18 and in the bottom is a drain cock 19. In the interior of the casing at the upper end thereof and, in the present instance, directly above the shaft 5, is a transversely arranged trough 20, suspended in any suitable manner, so as to leave a passage 21 at each side, and above this trough is a deflector 22. The trough 20 is arranged on an incline to allow oil to flow to one side of the casing, and communicating with one side of the trough is a pipe 23 which extends to a channel 24 in the bearing 1. A sight feed glass 25 is preferably mounted in the pipe. A pipe 26 leads from a channel 27 in the hub of the wheel 4 directly in line with the passage 16 of the sleeve and communicates with a channel 28 in the housing for the bearing 8. This bearing has a lubricating channel for the purpose of conducting lubricant to the shaft 9. On the trough 10 is a screen 29 to strain the lubricant as it is deflected into the trough.

The bearing 1 extends through one side of the casing and is notched to receive the edge of the casing, as shown in Fig. 2, and the other side of the casing is supported on the extended hub of the sprocket wheel 6; the casing having a ring 30 secured to the outer wall thereof. There is a bearing on said hub in the present instance.

A certain amount of lubricant is placed in the casing, as indicated in the drawings, and when the mechanism is started the oil will splash, due to the action of the chain and the sprocket wheels, throwing the oil to all parts of the mechanism including the interior of the sprocket wheels and chain. The oil collected by the chain and sprocket wheels will be thrown off at a tangent and some of this oil will strike the deflector 22 and will drop into the trough 20. Owing to the trough being inclined, the oil will flow from the trough through the tube 23 into the channels 3 of the sleeve 2 and will lubricate the shaft 5. It will then be thrown, by centrifugal force, through the pipe 26 to the passage 28 and will lubricate the shaft 9; the excess oil escaping at the ends of the bearings in both instances. If it is desired to increase the amount of oil in the casing, it can be admitted through the air vents 31 at the side of the casing or through the door 18 and, when it is necessary to cleanse the casing, this door can be opened and access can be had to the interior thereof.

It will be noticed that the ring 30 at one side of the casing has an annular groove 32 and there is a passage 33 forming communication between the groove and the interior of the casing so that any oil, or other lubricant, passing out of the space between the hub of the gear wheel 6 and the ring will be collected and will pass again into the casing.

I claim:—

1. The combination of a casing; chain gearing mounted within the casing, said casing forming an oil reservoir extending to the lower portion of the chain gearing; a transversely arranged trough open at both sides and mounted above one of the wheels some distance from the upper edge of the casing; and a centrally located deflector above the trough to catch the oil as it is thrown from the chain; and means for directing the oil to the bearing of one of the wheels.

2. The combination of a casing; a shaft; sprocket wheels on the shaft located within the casing; a second shaft and a second sprocket wheel thereon; also mounted within the casing; chains passing around the several sprocket wheels; a transversely arranged trough mounted above the main sprocket wheel and terminating short of the upper edge of the casing; a deflector on the casing above the trough, said trough being arranged on an incline; and a pipe extending from the lower end of the trough to the bearing of the main sprocket wheel, so that the oil collected in the trough from the wheel will be carried to the bearing.

3. The combination of a casing; a shaft; sprocket wheels on the shaft located within the casing; a second shaft and a second sprocket wheel thereon, also mounted within the casing; chains passing around the several sprocket wheels; a transversely arranged trough mounted above the main sprocket wheel and terminating short of the upper edge of the casing; a deflector on the casing above the trough, said trough being arranged on an incline; a pipe extending from the lower end of the trough to the bearing of the main sprocket wheel, so that the oil collected in the trough from the wheel will be carried to the bearing; a second shaft carried by the main wheel and having a sprocket wheel thereon; and a pipe leading from the hub of the main wheel to the bearing of the shaft carried thereby so that the oil will also be carried to said latter bearing.

In testimony whereof, I have signed my name to this specification, in the presence of two subscribing witnesses.

HAROLD S. PIERCE.

Witnesses:
   Jos. H. Klein,
   Wm. A. Barr.